US005647889A

United States Patent [19]

Stueble

[11] Patent Number: 5,647,889
[45] Date of Patent: Jul. 15, 1997

[54] AIR HANDLING APPARATUS AND METHOD FOR TEXTILE MACHINES

[75] Inventor: Helmut Stueble, Spartanburg, S.C.

[73] Assignee: LTG Lufttechnische GmbH, Spartanburg, S.C.

[21] Appl. No.: 267,570

[22] Filed: Jun. 28, 1994

[51] Int. Cl.$^6$ .................................................. B01D 33/01
[52] U.S. Cl. ........................... 95/20; 55/312; 55/344
[58] Field of Search ........................ 55/301, 304, 305, 55/344, 350.1, 471, 473, 310, 311, 312; 95/20

[56] References Cited

U.S. PATENT DOCUMENTS

| 385,899 | 7/1888 | Allfree | 55/287 |
|---|---|---|---|
| 1,842,316 | 1/1932 | Coulter | 55/239 |
| 3,412,545 | 11/1968 | Lippuner | 57/304 |
| 3,762,143 | 10/1973 | Stewart | 55/283 |
| 3,926,665 | 12/1975 | Harrap et al. | 55/350.1 |
| 3,951,623 | 4/1976 | Furstenberg | 55/96 |
| 4,217,116 | 8/1980 | Seever | 55/96 |
| 4,494,375 | 1/1985 | Rao et al. | 55/314 |
| 4,502,874 | 3/1985 | Levie et al. | 55/300 |
| 4,681,604 | 7/1987 | Niederer | 55/301 |
| 4,778,491 | 10/1988 | Yow, Sr. | 55/96 |
| 4,857,090 | 8/1989 | Hartness | 62/91 |
| 4,895,581 | 1/1990 | Starling | 55/350.1 |
| 5,174,797 | 12/1992 | Yow, Sr. et al. | 55/96 |
| 5,279,629 | 1/1994 | Stueble | 55/262 |

FOREIGN PATENT DOCUMENTS

982604  2/1965  United Kingdom .

Primary Examiner—Thomas R. Weber
Attorney, Agent, or Firm—Dority & Manning, P.A.

[57] ABSTRACT

An air handling apparatus for use with textile machines is provided to separately filter usable fiber material and waste fiber material without adversely interrupting operation of the textile machine. The apparatus includes a common vacuum system which is configured for drawing first and second independent airstreams from the textile machines. A filtering system is in pneumatic communication with the common vacuum system. The filtering system comprises filtering devices for separately filtering the first and second airstreams in a first configuration and for combining and commonly filtering the first and second airstreams in a second configuration. The apparatus includes a control device which is configured to automatically shift the filtering system between the first and second configurations.

33 Claims, 8 Drawing Sheets

AIR HANDLING APPARATUS AND METHOD FOR TEXTILE MACHINES

BACKGROUND OF THE INVENTION

The present invention relates to an air handling and filtering system, and more particularly to an air cleaning system for use with textile spinning machines.

As discussed in my U.S. Pat. No. 5,279,629, with modern textile machines, particularly air spinning machines and open-end spinning machines, a significant amount of dust, fly, and fiber material in general is generated during the yarn spinning process. The fly and fiber material consist essentially of two types: waste fiber material that is generally of little value (trash waste), and reusable fiber material (white waste) which is far more valuable and useful. Various attempts have been made in the art to filter the trash waste and white waste without adversely impacting upon the operation of the textile machines. One such solution is disclosed in my U.S. Pat. No. 5,279,629.

Generally, the filtering devices and methods known in the art for separately filtering the white waste and trash waste material require that the exhaust fan be shut off during the cleaning operation while the waste matte is pulled from the filtering devices. This is a time consuming operation which significantly adversely impacts upon the production capacity of the textile machines.

In U.S. Pat. No. 5,279,629, I provided a method and apparatus wherein the white waste is drawn and filtered by a common suction and filtering source, with the trash waste being independently filtered at the textile machines. This system provides a means for cleaning the waste trash filters without the necessity of shutting down the exhaust fan drawing the airstreams. Additionally, drawing of the airstreams with a common suction source is an energy efficient means. In this manner, the airstreams were efficiently filtered and production of the textile machines was not affected.

However, the apparatus and method of U.S. Pat. No. 5,279,629 still required that an operator enter the end housing unit of the filtering system, which is traditionally attached to the end unit of a textile machine, in order to clean the filtering device which filtered the waste trash material. During the time required for the operator to clean this filter, the airstream conveying the waste trash is no longer being drawn. The invention of the '629 patent also does not provide for common filtering of the waste trash.

The present invention significantly improves upon the method and apparatus disclosed in U.S. Pat. No. 5,279,629, and provides a more efficient method and device for separately filtering and cleaning independent airstreams from a plurality of textile machines.

OBJECTS AND SUMMARY OF THE INVENTION

It is therefore a principal object of the present invention to provide an improved air filtering system and method for textile machines which is not detrimental to yarn quality or formation during cleaning of the filters.

Another principal object of the present invention is to provide a more versatile air handling and filtering system and method which maintains a relatively constant negative pressure at the spinning stations during all phases of operation, and which requires little or no man power to operate.

And still a further object of the present invention is to provide an automated arrangement for selectively cleaning the waste filter of a textile machine without securing or shutting off the suction supply for the white waste filter.

A further principal object of the present invention is to provide a more energy efficient air handling and filtering system for use with textile machines.

And yet another principal object of the present invention is to provide an automated air handling and filtering system for textile machines wherein the filters of the system can be cleaned without operator intervention.

Additional objects and advantages of the invention will be set forth in part in the description which follows, and in part will be obvious from the description or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, an air handling apparatus is provided for use with textile machines for separately filtering usable fiber material and waste fiber material without adversely interrupting operation of the textile machine. The apparatus includes a common vacuum system which is configured for drawing first and second independent airstreams from the textile machines. The first airstream conveys generally useful white waste from the textile machine and the second airstream conveys generally trash waste from the textile machine. A filtering system is included in pneumatic communication with the common vacuum system. The filtering system comprises filtering devices for separately filtering the first and second airstreams in a first configuration and for combining and commonly filtering the first and second airstreams in a second configuration. The filtering system further includes a first filter device configured for filtering white waste from the first airstream in the first configuration, and a second filter device configured for separately filtering trash from the second airstream in the first configuration. The system includes a third filter device configured for filtering any combination of white waste and trash waste from the combined first and second airstreams in the second configuration. The apparatus further includes a control device configured to automatically shift the filtering system between the first and second configurations.

Preferably, the first filter device comprises a centralized filtering system for filtering the first airstreams from a plurality of textile machines. In a preferred embodiment, the centralized filtering system comprises a fiber separator. Additionally, the second filter device preferably comprises individual filters disposed in housing structures generally adjacent the end of each textile machine. The second filter devices are in pneumatic communication with the centralized filtering systems for drawing the second airstream therethrough. The second airstream is combined with the first airstream without being filtered in the second configuration, with the control device comprising means for isolating the first filtering device from the combined airstreams and for directing the combined airstreams to the third filter device in the second configuration.

In a preferred embodiment, the control device further comprises an actuable device configured to displace or move the second filter device in the second configuration so that the second airstream does not pass therethrough but combines with the first airstream wherein the combined airstreams are then conveyed to the third filter device. In a preferred embodiment, the actuable device comprises a mechanical arm mechanism configured to tilt the second filter device in the second configuration to such an angle so that the second airstream is drawn past, or essentially parallel to, the filter by the common vacuum system. In this manner, the second airstream tends to strip the waste fiber matte away from the second filter device when the second filter device is tilted. Thus, the second filter device is automatically cleaned without requiring an operator to enter the end housing unit.

Preferably, the third filter device comprises a fiber separator which is configured for filtering either white trash or waste trash. The third filter device is isolatable from the first and second filter devices preferably through remotely controlled valves.

In yet another preferred embodiment of the invention, the apparatus further includes a fourth filter device disposed operably downstream from the first, second, and third filter devices. This fourth filter device is configured for filtering essentially fine particulate matter which is not filtered by the other filters. Preferably, this fourth filter device comprises a drum-type filter.

In still another preferred embodiment, the apparatus includes an auxiliary vacuum and filtering system for drawing the first and second airstreams and filtering at least the first airstream. The auxiliary system acts as a back-up to the common vacuum system and the first filter device. Preferably, the auxiliary vacuum and filtering system comprises a fan and filter disposed in the end housing structure adjacent the textile machines. An isolation device is configured for isolating the auxiliary fan and filter from the common vacuum system. This fan is capable of drawing the first and second airstreams from the respective textile machine.

In further accordance with the objects of the invention, a method is provided for separately filtering two independent airstreams from a plurality of textile machines. The method allows for filtering of generally usable fiber material and generally trash fiber material without adversely affecting production at the textile machines. The method comprises the steps of drawing first and second independent airstreams from the textile machines with a common vacuum source. The first airstream conveys usable fiber material and the second airstream conveys trash fiber material. The method involves filtering the first airstream with a first filter device and filtering the second airstream with a second filter device in a normal operating configuration. Finally, the method calls for combining the second airstream with the first airstream without filtering the second airstream for a period of time in an alternate configuration for cleaning the second filter device. The combined airstreams are directed to a third selectively isolatable filter device for filtering both usable fiber material and trash fiber material therefrom while the second filter device is cleaned.

The accompanying drawings which are incorporated in and constitute a part of the specification, illustrate one embodiment of the invention and, together with the description, serve to explain the principles of the invention.

DETAILED DESCRIPTION OF THE PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. The number of components in the drawings is consistent throughout the application, with the same components having the same number in each of the drawings.

Figure 3A:
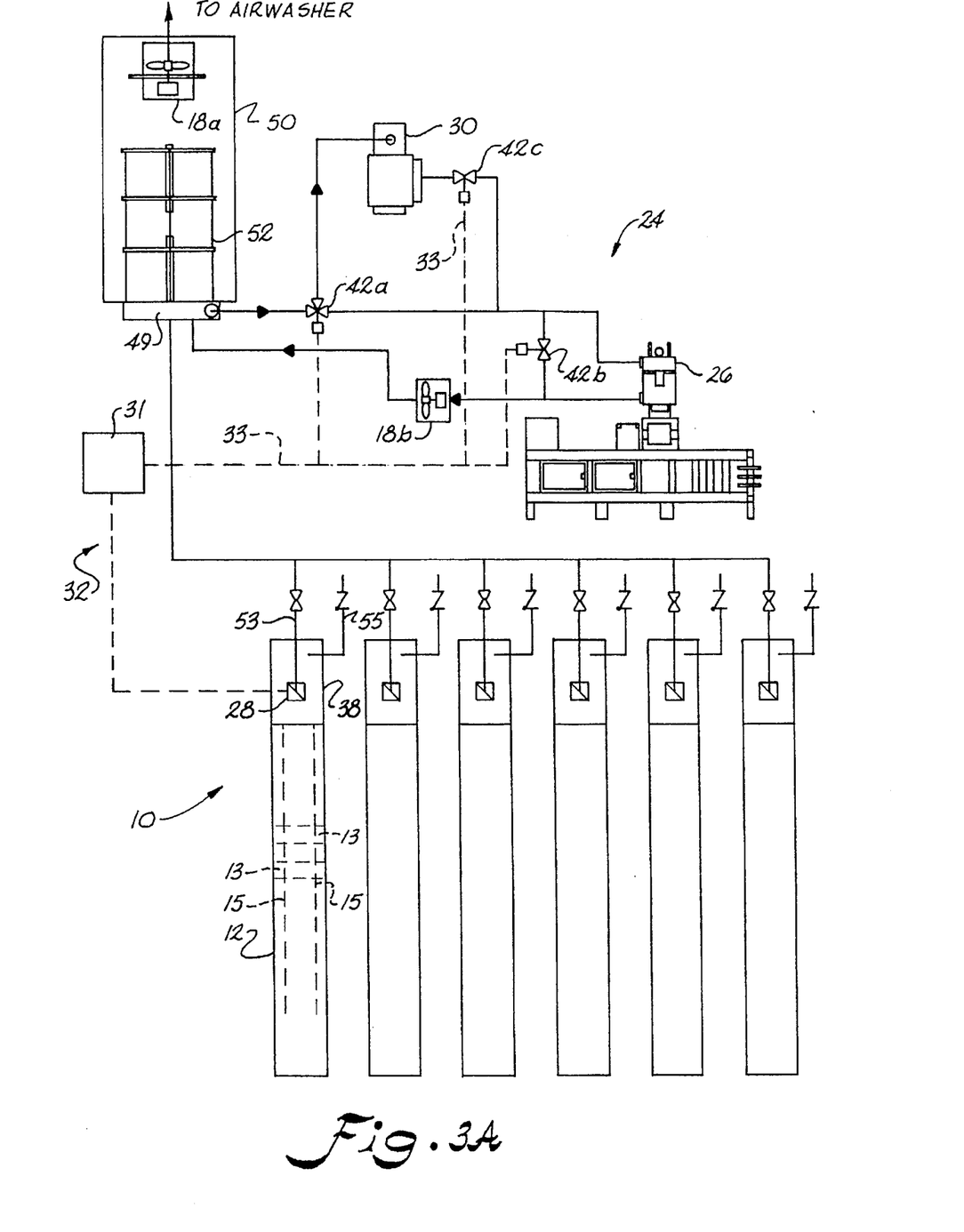
FIGS. 3a through 3c are diagrammatic representations of various embodiments of the air handling system according to the invention.
Figure 3B:
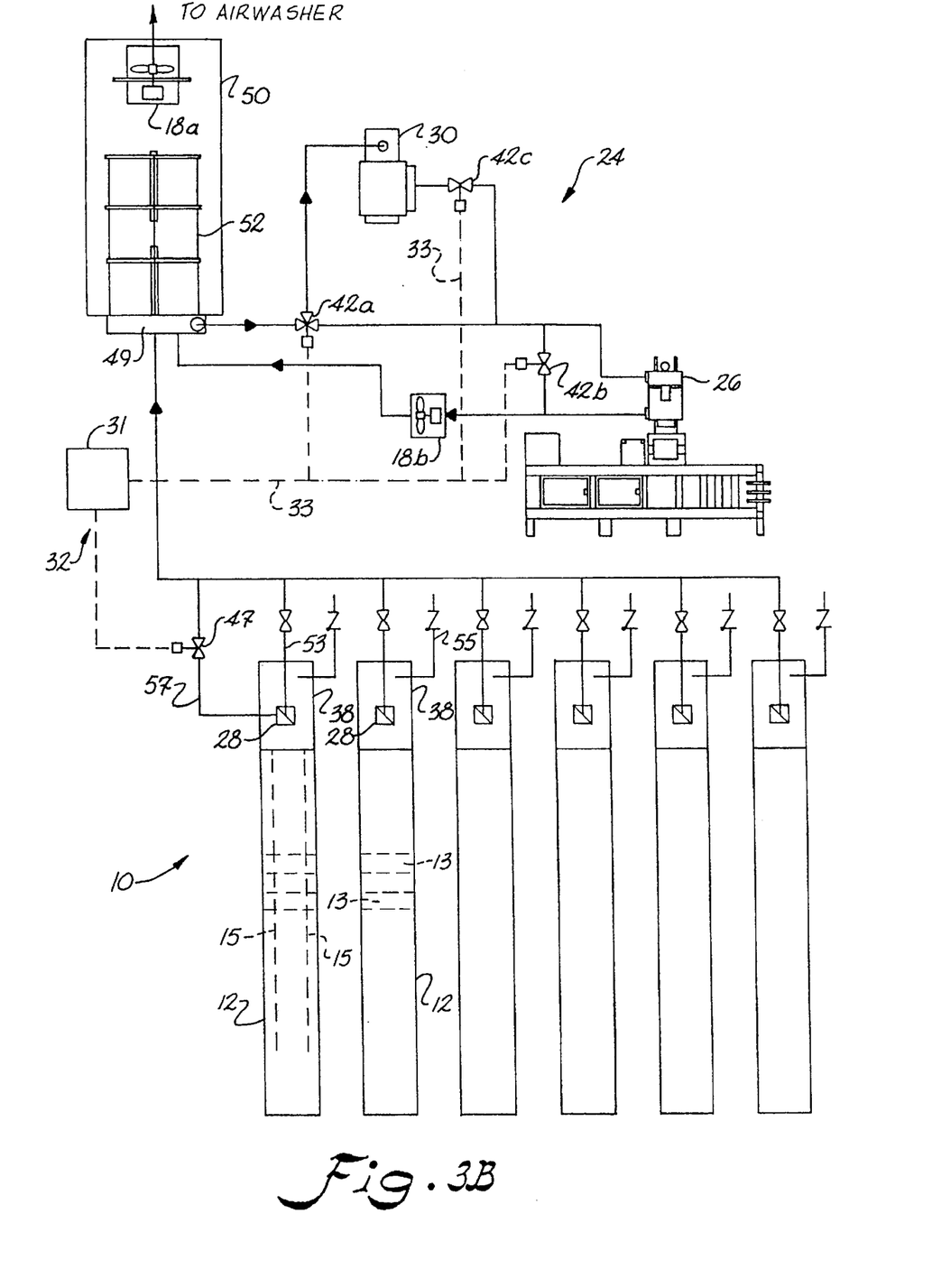
Figure 3C:
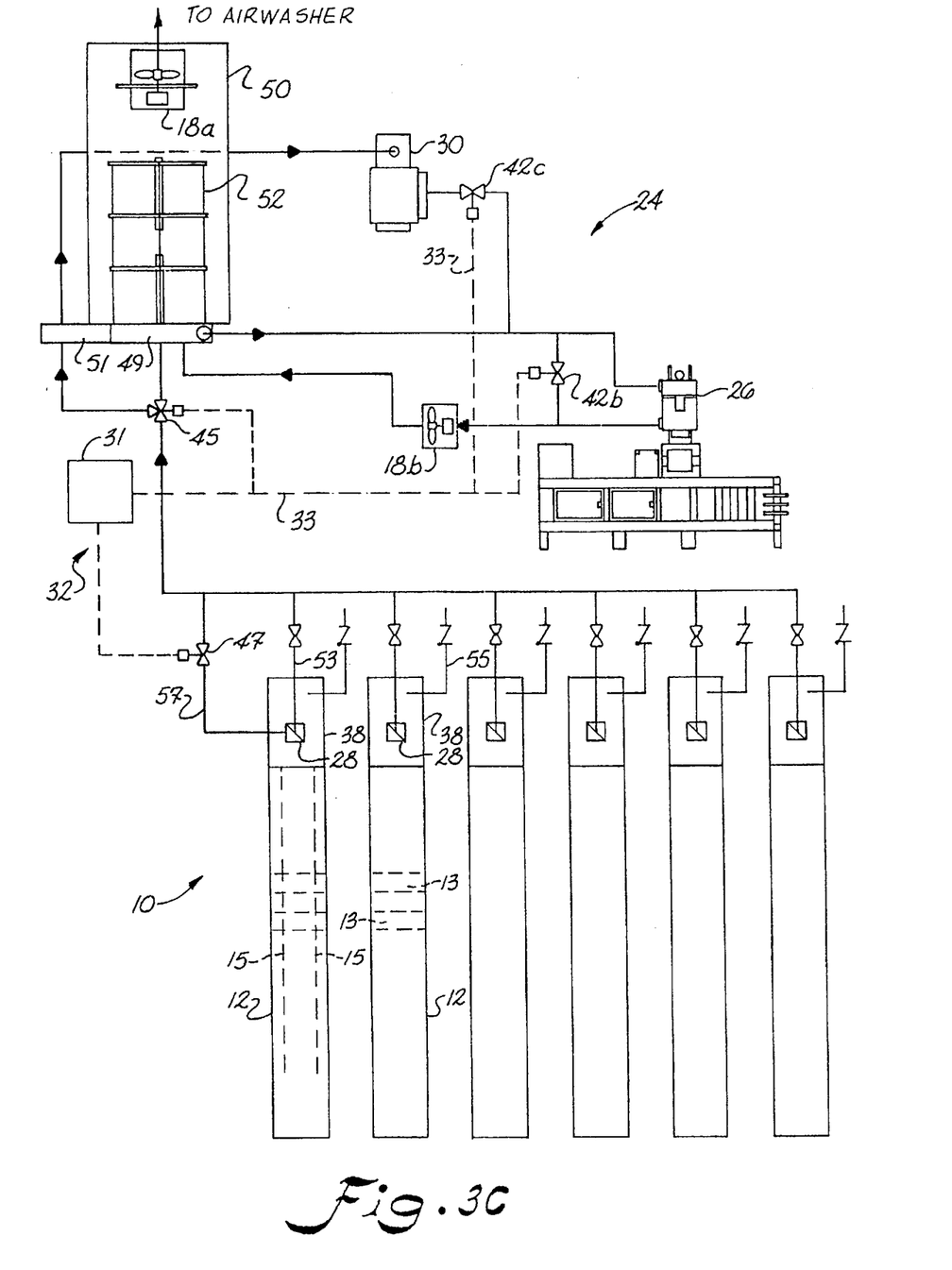

In accordance with the present invention, and as illustrated generally in FIGS. 3a–3c, an air handling apparatus 10 is provided for use with a plurality of textile machines 12. The textile machines are generally of the type having rows of spinning stations 13, such as an open-end spinning machine or a jet spinning machine. These types of textile machines are well known in the art and need not be described in detail herein. Textile machines 12 are of the type that generally require the drawing and conveying of separate airstreams therethrough. This can be accomplished, for example, by internal ducting 15 (dashed lines) running generally lengthwise along textile machines 12. A vacuum or negative pressure is drawn within ducting 15 through at least two independent channels, as shown generally in FIG. 1. Typically, each spinning station 13 is in pneumatic communication with the internal ducting 15. At least one of the ducts 15 is configured for conveying generally useful fiber material (white waste) from the yarn formation area of each spinning station. It is essential to quality yarn formation that this fiber material be continuously conveyed away from the yarn formation area so as not to detrimentally affect yarn formation. Another of the ducts 15 is configured for conveying generally waste fiber material (trash waste) away from each spinning station 13. This waste fiber material can be generated, for example, from piecing operations or cleaning of spinning components. An example of a textile machine for which the present air handling apparatus 10 can be configured is the Murata Jet Spinner No. 802.

Apparatus 10 according to the invention includes a common vacuum system. In the diagrammatic representations of FIGS. 3a–3c, the common vacuum source comprises at least one fan 18a for drawing the first and second airstreams 20 and 22 (shown, for example, in FIG. 1) through the end housing units 38 of the textile machines 12. However, it should be understood that the common vacuum source may actually comprise a configuration of many fans, such as additional fan 18b, so long as the configuration of fans serves to produce a suction force common to the plurality of textile machines.

A filtering system, generally 24, is provided in pneumatic communication with the common vacuum system or fans 18a and 18b. In other words, fans 18 draw the airstreams through the filtering system. Filtering system 24 comprises filtering devices for separately filtering first and second airstreams 20 and 22 in a first configuration. Filtering system 24 is also configured for being automatically shiftable into a second configuration wherein the two air streams may be commonly filtered by an alternate filtering device or may be individually filtered by alternate filtering devices, as will be explained below.

Filtering system 24 includes a first filter device configured for filtering white waste from first airstreams 20 in the first configuration. In a preferred embodiment, this first filter device may comprise a single filter or a configuration of separate filters. For example, referring to FIG. 3a, the first filter device may comprise filter 49 and filter device 26. In this embodiment filter 49 acts as a pre-filter to filter device 26. Typically, conventional filtering devices are rated for a specific volume of air. If the system is configured with a great number of textile machines, the volume of air to be filtered may exceed the capacity of any single filtering device. In this event, a pre-filter may be utilized to reduce the filtering requirements of any downstream filter. Filter 49 may comprise, for example, a screen type filter which is capable of filtering out a significant portion of the white waste material in the plurality of airstreams while allowing fine particulate matter or dust to pass therethrough to, for example, a conventional drum type filter 52.

In the illustrated embodiment of FIG. 3a, the airstreams are drawn from the textile machines 12 through ducting 53 to filter 49 by fan 18a, and then to filter device 26 by means of fan 18b. Preferably, filter 26 simultaneously filters any remaining white waste from all of the first airstreams 20 drawn from the plurality of textile machines 12. Filter device 26 can comprise any manner of conventional filtering devices, such as a fiber compactor or fiber separator. The operation and applicability of these conventional filtering devices are well understood by those skilled in the art and need not be discussed in detail herein. Generally, any conventional fiber separator or filtering device which is useful in filtering white waste can be used as filter device 26. If the filter device has the capacity to directly filter the entire volume of air from the textile machines, a pre-filter 49 may not be needed System 24 also includes a second filter device 28 which is configured for filtering trash waste from the second airstreams 22 also in the first configuration. In a preferred embodiment, this second filter device may comprise a single filter or a configuration of separate filters. As illustrated in the figures, the second filter device comprises individual filters 28 which are housed in an end housing unit 38 adjacent the ends of the textile machines, as will be explained in greater detail below. Generally though, in this embodiment the second airstreams conveying the waste trash are individually filtered within the respective housing units 38. However, in an alternative embodiment not illustrated in the figures, second filter device 28 may comprise a centralized filter, such as filter 26, for simultaneously filtering the combined second airstreams from the textile machines.

System 24 also includes a third filter device configured for filtering either trash waste, white waste, or a combination of both from combined first and second airstreams 20 and 22 in a second configuration. As shown in FIG. 3a, this third filter device may comprise a single filter or a configuration of separate filters. In a preferred embodiment, the third filter device may comprise filter 30, which may be a conventional fiber separator or screen separator. Again, any conventional filtering device or system may be utilized as third filtering device 30. As discussed above, it may be desired to pass the combined airstreams through an upstream or pre-filter, such as filter 49, before directing the combined airstreams to filter 30. The appropriate control means for passing the combined airstreams through filter device 30 will be discussed below.

Figure 1:
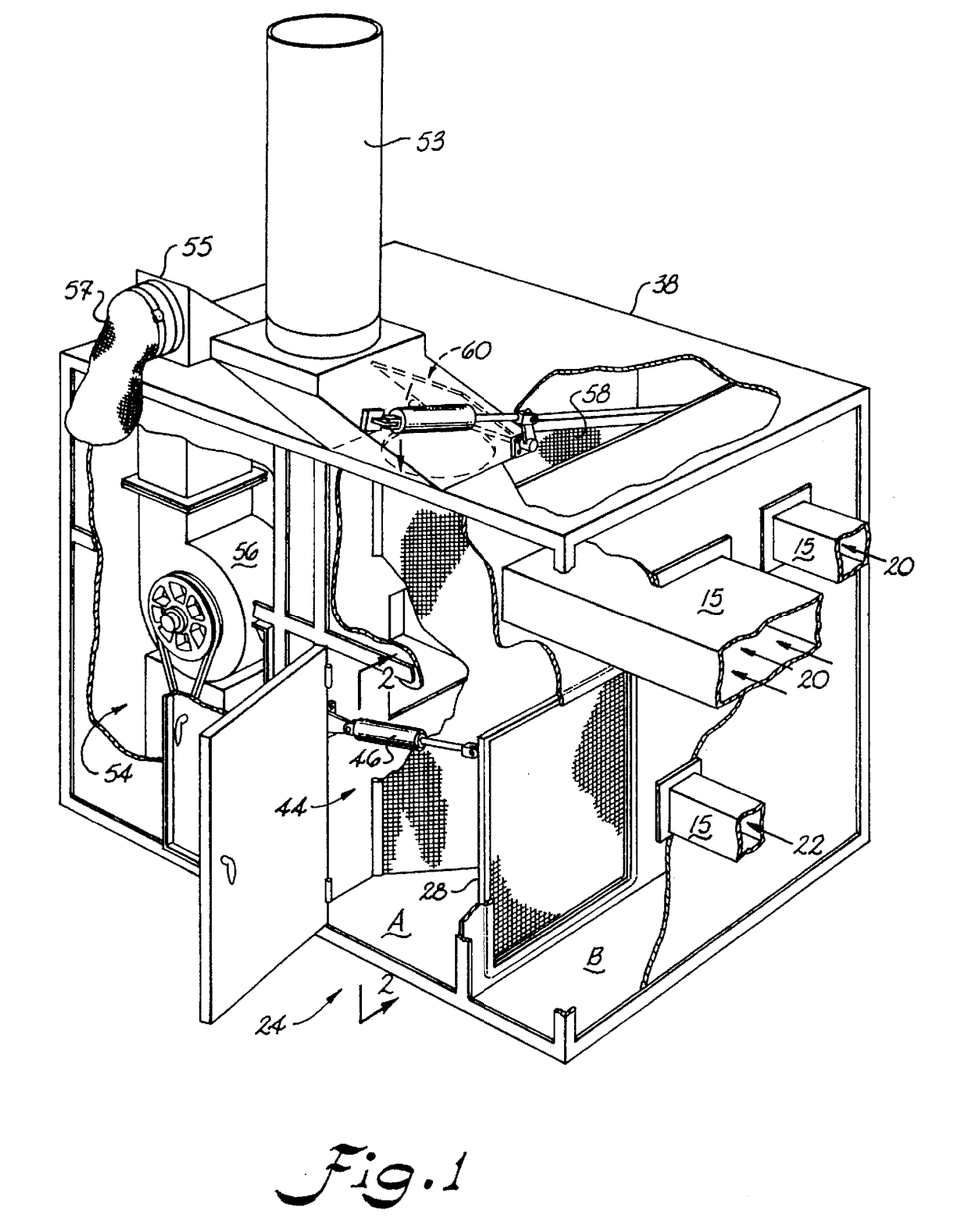
FIG. 1 is a perspective view of a portion of the air handling and filtering apparatus according to the invention.
Figure 2A:
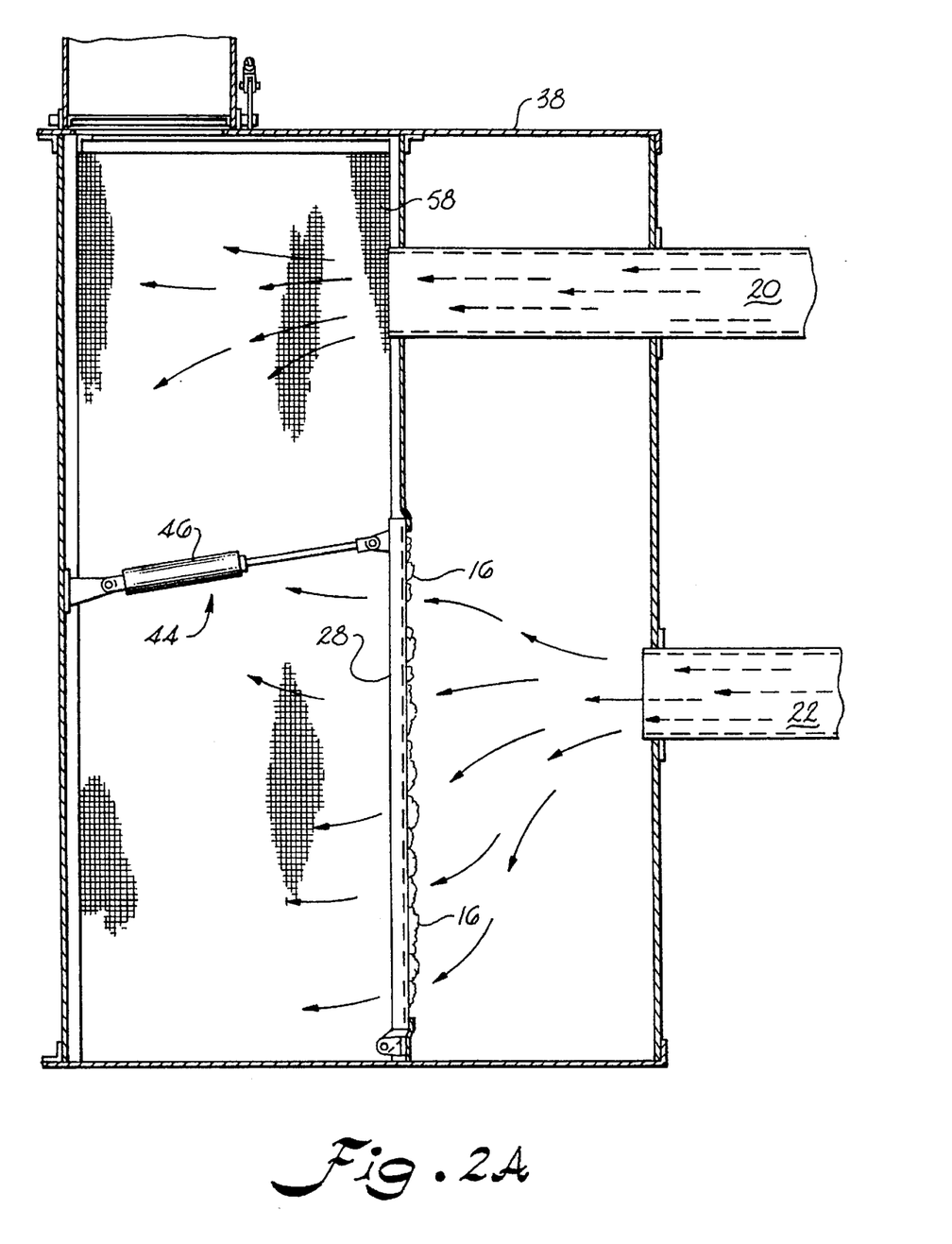
FIGS. 2a and 2b are enlarged operational views of a portion of the apparatus shown in FIG. 1, and particularly illustrate the tilting mechanism for displacing the second filter.

Apparatus 10 further comprises a control device 32 which is configured to automatically shift the filtering system 24 between the first and second configurations. Referring particularly to FIG. 3a, in the first configuration the first airstreams and second airstreams are drawn from textile machines 12 through ducts 15 and through end housing structures 38 and duct 53 by fan 18a. Duct 53 draws a suction from chamber A (FIG. 1) of end-housing structure 38. Referring particularly to FIGS. 1 and 2a, second airstreams 22 which convey waste trash 16 are drawn through filter 28 which is housed in end housing structure 38. Filter 28 filters out waste trash 16. The filtered second airstream then is combined with the first airstream 20 which, at this point, is still unfiltered. The combined airstreams, which includes unfiltered airstream 20 and filtered airstreams 22, are drawn by at least the suction force of fan 18a, or any other combination of fans, including an additional fan 18b which acts to draw the combined airstreams conveying the white trash through first filter device 26 or third filter device 30. Generally though, the airstreams are drawn from the end housing structures and to pre-filter 49 by fan 18a and then directed through first filter device 26 by fan 18b, as discussed above. The filtered airstreams may then be exhausted to fourth filter device 50 (illustrated in FIGS. 3a, 3b and 3c) in the first configuration of filtering system 24. Fourth filter device 50 may preferably be provided to filter fine particulate matter from the airstreams which is not capable of being filtered by any of the other filtering devices. Preferably, fourth filter device 50 comprises a conventional drum-type filtering system 52. A conventional known drum filter system for use with the present apparatus is the drum filter marketed by LTG Technologies, Inc., of Spartanburg, S.C. Again, these drum-type filters are well understood by those skilled in the art. In the embodiment of FIG. 3a, drum filter 52 is illustrated as being adjacent filter 49. In this embodiment the airstreams may be directed once again through filter 49 before passing into drum filter 52. However, it should be understood that this is a mere design consideration. Fourth filter 50 may separately located with the filtered airstreams being directed thereto.

Figure 2B:
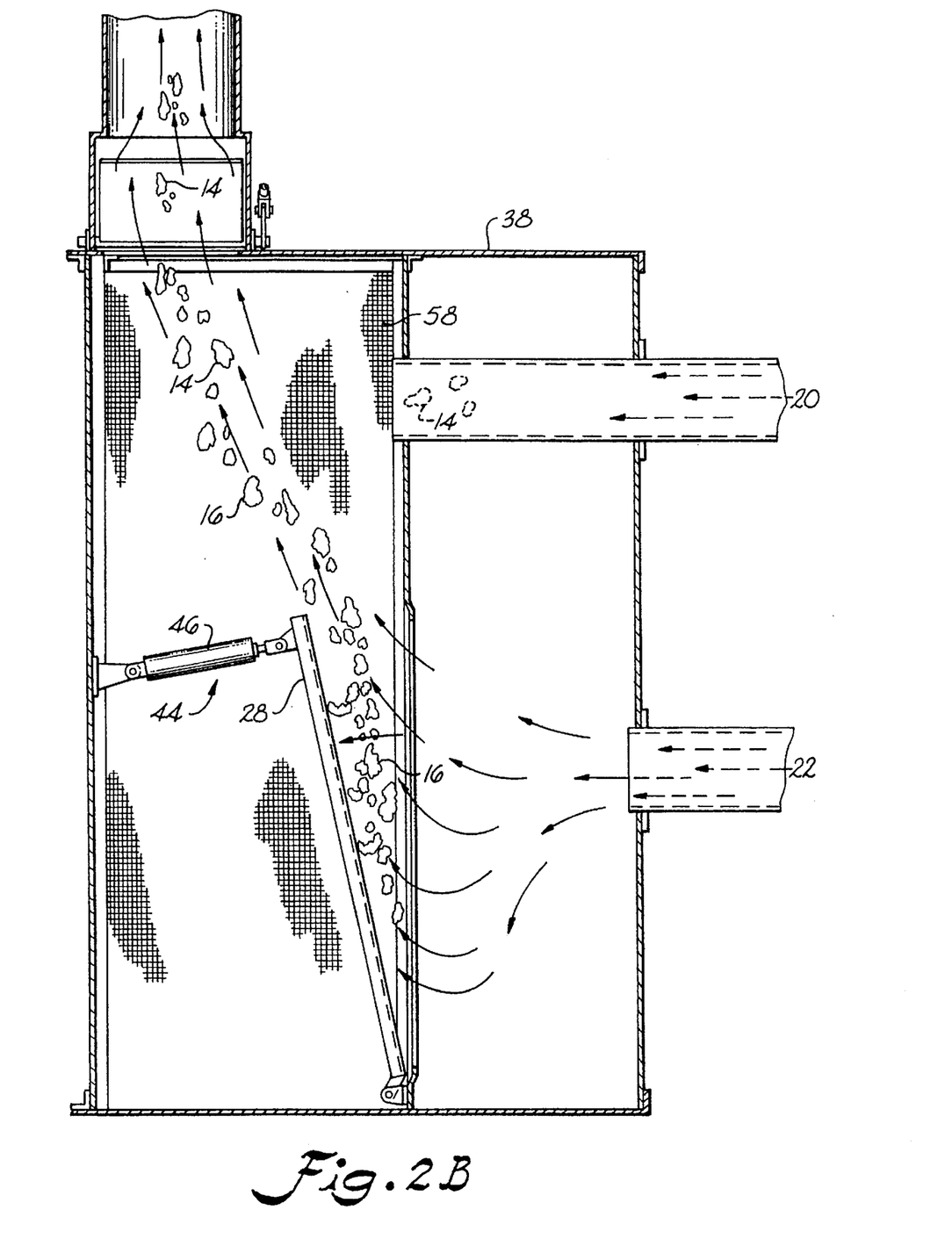

The apparatus is automatically shiftable to a second configuration wherein the first and second airstreams are alternately filtered, either singularly or in combination. In one preferred embodiment of the second configuration of the system, the airstreams are combined and commonly filtered. Referring particularly to FIGS. 2b and 3a, second filter device 28 is displaced or tilted through an actuable device 44. Preferably, actuable device 44 comprises a mechanical arm or piston-type arrangement 46. Mechanical arrangement 46 is automatically actuable through control device 32. In other words, filter device 28 can be automatically tilted or displaced remotely from a control station of the control device 32. For example, mechanical arm 46 may comprise a motorized actuating arm or ram. For ease of illustration and by means of explanation only, mechanical arm 46 is depicted in the figures as a mechanical ram type device. However, it should be understood that any means or device may be provided for automatically tilting or otherwise moving filter 28, for example a chain drive or geared system may be used. Any and all such configurations are within scope and spirit of the invention.

Referring particularly to FIG. 2b, it can be seen that filter device 28 is tilted or displaced to such an angle so that second airstream 22 is not drawn through the filter, but is drawn essentially parallel to the surface of the filter. Although illustrated as being tilted, filter device may be moved or displaced in some other manner so that the second airstream does not pass through filter 28. Tilting of filter 28 is preferred in that the waste trash 16, which is now conveyed past the surface of filter 28, tends to strip away the waste fiber matte which has adhered to the surface of filter 28. The stripped away fiber matte is then also drawn away in the combined airstreams. Thus, it should be understood that filter 28 is self-cleaning in this regard. Once the filter device 28 has been shifted or tilted, the second unfiltered airstream combines with the first unfiltered airstream so that the resulting combined airstream contains both white waste and trash waste.

Figure 1A:
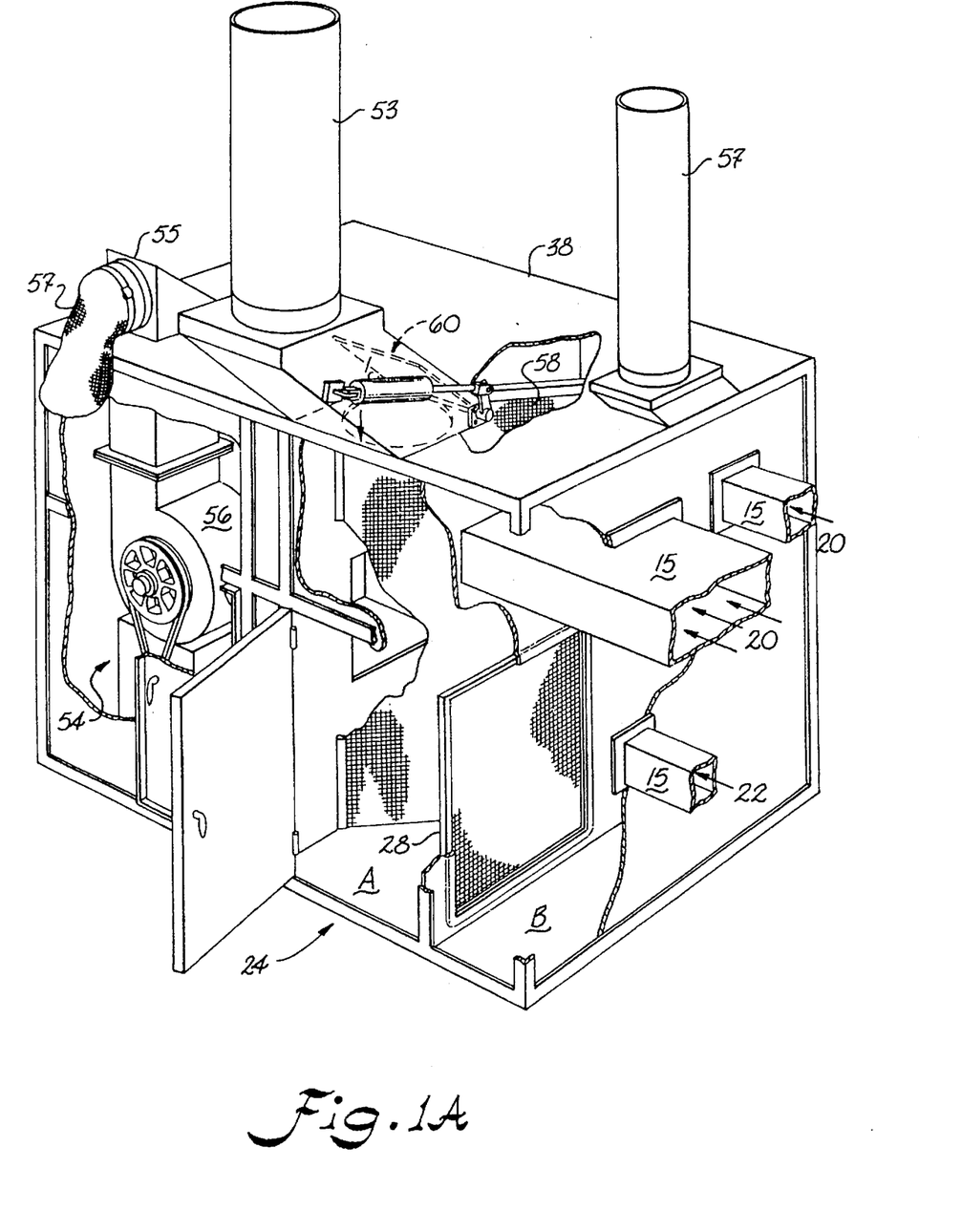
FIG. 1a is a perspective view of a portion of the air handling and filtering apparatus according to an alternative embodiment of the invention.

Another preferred embodiment for combining the first and second airstreams is depicted in FIGS. 1a and 3b. In this embodiment, a second duct 57 is in communication with structure 38 and draws a suction from chamber B of the structure. In this embodiment, it is not necessary to provide means for tilting or displacing filter 28. In the first configuration of the filtering system according to this embodiment, duct 57 is isolated through, for example, valve 47, or a damper, or other suitable means. In this manner, in the first configuration second airstream 22 is drawn through filter 28 and into chamber A. In the second configuration, duct 57 is automatically unisolated by opening valve 47 (or appropriate damper) and draws a suction on chamber B thereby drawing second airstream 22 from chamber B before it passes through filter 28. The ducting for first airstream 20 runs through chamber B so that first airstream 20 is still drawn from chamber A by way of duct 53. Filter 28 could then be pulled for cleaning or servicing. The two unfiltered airstreams are then combined downstream of valve 47.

Figure 1B:
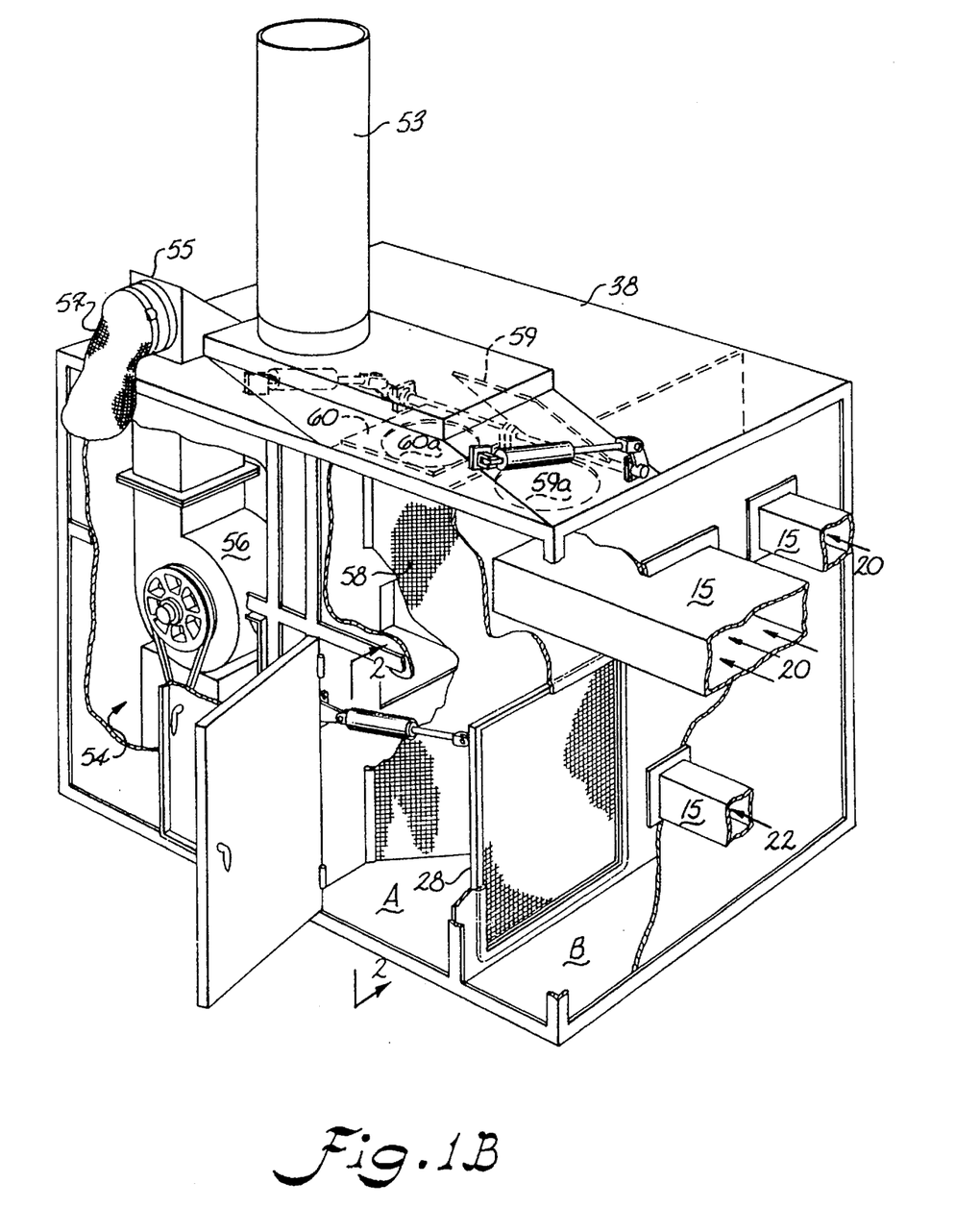
FIG. 1b is a perspective view of an alternative embodiment of the air handling and filtering apparatus according to the invention.

Another preferred embodiment for alternately filtering the first and second airstreams in the second configuration is illustrated in FIG. 1b. In this embodiment, two openings exist in end-housing structure 38. One opening 60a opens into white waste chamber A of structure 38 and is selectively isolatable by way of damper 60. The other opening 59a opens into trash waste chamber B and is selectively isolatable by way of damper 59. Each damper is provided with a separate actuator which is preferably remotely activated through control system 32. Both openings open into a common collection box and duct 53. In the first configuration of the system, damper 59 to trash waste chamber B is closed and damper 60 to white waste chamber A is open. Thus, in this configuration the embodiment is essentially identical to the embodiment of FIG. 1.

In the second configuration of the embodiment of FIG. 1b, dampers 59 and 60 are switched so that damper 59 is open and damper 60 is shut. The dampers are preferably switched on a timed basis. In this manner, second airstream 22 is conveyed directly through opening 59a to the common collection box without passing through filter 28. First airstream 20, which is initially conveyed through chamber B is drawn from chamber A through filter 28 and into chamber B to combine with the second airstream. Thus, white waste collects on one side of filter 28 while the trash waste matte is sucked from the filter and drawn out opening 59a. The downstream filtering system 24 would function essentially the same as described with regards to FIG. 3a with the exception that filter 30 would essentially filter only trash waste from the combined airstreams since the white waste collects on filter 28. After a predetermined period of time, dampers 59 and 60 are automatically switched back to their first configuration positions and any white waste which had collected on filter 28 would then be drawn through duct 53 and collected by first filter device 26. This embodiment has the particularly advantageous features that filter 28 is essentially self cleaning without requiring additional duct 57 or valve 47 as needed for the embodiments of FIG. 3c and 1a.

Referring particularly to FIGS. 3a and 3b, substantially simultaneously with the shifting of filter device 28, or the opening of valve 47, or the shifting of dampers 60 and 59, first filter device 26 is isolated from the combined airstreams by way of valves 42. In the arrangement shown in FIGS. 3a and 3b, valve 42a is a three-way valve and is automatically shifted to direct unisolate third filter device 30, thereby directing the combined airstreams to third filter device 30. Valve 42c is opened. Preferably, bypass valve 42b is provided and is also opened in the second configuration. The valves are preferably remotely controlled also by control device or system 32. For example, the valves may comprise conventional motorized or solenoid valves. It should also be understood that any configuration of isolation devices or valves may be utilized to accomplish the objective of isolating first filter device 26 and for directing the combined airstreams to third filter device 30 for filtering of both white waste and trash waste. It should also be understood that first filter device 26 is "isolated" in the sense that it no longer is filtering white waste. In other words, the airstream exiting from third filter device 30 may actually be drawn through first filter device 26 before being exhausted to fourth filter device 50. However, since the combined airstreams have already been filtered by device 30, first filter device 26 essentially serves no purpose and the combined airstream simply passes through the filter device. Alternatively, as illustrated in FIGS. 3a and 3b, a bypass valve 42b is provided so that the airstream does not pass through filter device 26.

Once filter device 28 has been tilted or shifted for a sufficient amount of time so that the trash waste fiber matte has been stripped from the filter screen, or the matte has been otherwise removed from the screen in the embodiment of FIGS. 1a and 1b, the system is automatically shifted back to the first configuration by means of control device 32.

Control device 32 preferably comprises a remote control station 31 and lines or connections 33 to the various valves or isolation devices, actuable dampers, and the tilting mechanism 44. In this manner, a single operator can simultaneously shift the entire system to the second configuration from a remote location so that all of the second filters 28 are simultaneously cleaned. Once the cleaning process is complete, the operator can simply shift the system back to the first configuration. In an alternative embodiment, control device may include an automatic timing circuit for automatically shifting configurations at predetermined time intervals. The control devices and systems for mechanized arms, such as tilting device 44, and for controllable valves, such as solenoid or motorized valves, are well known in the art and any such suitable system is within the scope of the invention.

As mentioned above, apparatus 10 may also include an auxiliary vacuum and filtering system 54, particularly illustrated in FIGS. 1a and 1b. Auxiliary system 54 is provided to continuously draw and filter at least the first airstreams 20 in the event that the common vacuum source and first airstream filter 26 are isolated for servicing. Referring particularly to FIG. 1, the end housing structure 38 may include an isolation device or damper 60 for isolating the structure from the common vacuum source and filtering devices 24. In the embodiment of FIG. 1a, duct 57 may also include a respective damper. In other words, when damper 60 is shut, the common vacuum source of fans 18 no longer draws first and second airstreams 20 and 22 through the end housing structure 38. In this event, auxiliary vacuum and filtering system 54 includes an auxiliary fan 56 which would be started upon shutting damper 60. Fan 56 has the capacity to draw first and second airstreams 20 and 22 from the respective textile machine associated with end housing structure 38. Fan 56 would draw first airstreams 20 through auxiliary first filtering device 58. Second airstream 22 would be drawn by fan 56 through filter device 28 and then through filter 58. In other words, the second airstream 22 would also be drawn through filter 58 after being filtered by device 28 to combine with first airstream 20. Fan 56 would then exhaust the combined airstreams through ducting 55, which may contain an additional isolation device, into a separate containment device, such as a bag or filter 57. Filter 57 aids in reducing the fine particulate airborne matter exhausted into the textile mill. Once the centralized filtering system 24 is brought back on line, damper 60 is open and fan 56 is secured. The system is then returned to the first configuration described above.

An alternative preferred embodiment of the system is illustrated generally in FIG. 3c. In this embodiment, the system is shifted to the second configuration by automatically opening valve 47, as discussed above in regards to the embodiment of FIG. 3b. However, in the embodiment of FIG. 3c, a second pre-filter device 51 is provided. Normally, filter 49 is provided to filter primarily white waste in the first configuration of the system. It may be undesirable to contaminate this filter 49 with trash waste in the second configuration. In this case, the combined airstreams may be directed through a separate pre-filter 51 in the second configuration before being directed to the third filter device 30. To accomplish this, three-way valve 45 is provided and is simultaneously actuated with valve 47 upon shifting the system into the second configuration. Once shifted, valve 45 directs the combined airstreams in the second configuration through pre-filter device 51, instead of filter 49. From pre-filter device 51, the airstreams are then directed to filter device 30. Filter 51 may comprise an identical filter to filter 49, or may comprise any other suitable filtering device. Additionally, although filter 51 is illustrated as adjacent filter 49 and in communication with fourth filter device 50, it should be understood that this is a mere design consideration and illustrated this way only for purposes of explanation. Filter device 51 may be separately disposed in the system in any manner of configuration. Also, filter 51 may actually comprise a section of filter 49. In this embodiment, a variably positionable damper may act as the equivalent of three-way valve 45 to direct the airstreams to the separate distinct regions of filter 49.

It should be understood that the arrangement of a separate pre-filter device 51 as illustrated in FIG. 3c can be combined in any of the other configurations of the invention, particularly those illustrated in FIGS. 3a and 3b. It should be further understood that any of the components or arrangements illustrated in the figures is interchangeable and that the systems illustrated in FIGS. 3a through 3c are but mere examples of a countless number of embodiments of the system.

It will be apparent to those skilled in the art that various modifications and variations can be made in the apparatus and method of the present invention without departing from the scope or spirit of the invention. For example, the arrangement of filters and fans can take on a countless number of variations and still remain within the scope of the appended claims. Thus, it is intended that the present invention cover the modifications and variations of the invention provided they come within the scope of the claims and their equivalents.

What is claimed is:

1. An air handling apparatus for use with textile machines for separately filtering useable fiber material and waste fiber material without adversely interrupting operation of the textile machine, said apparatus comprising:

a common vacuum system, said common vacuum system configured for drawing first and second independent airstreams from said textile machine, said first airstream conveying generally useful white waste from said textile machine and said second airstream conveying generally trash waste from said textile machine;

a filtering system in pneumatic communication with said common vacuum system, said filtering system comprising filtering devices for separately filtering white waste from said first airstream and trash waste from said second airstream in a first configuration, and for combining said first and second airstreams in a second configuration wherein said second airstream is unfiltered and said first airstream is filtered or unfiltered, said filtering system further comprising:

a first filter device configured for filtering white waste from said first airstream in said first configuration;

a second filter device configured for separately filtering trash waste from said second airstream in said first configuration; and a third filter device configured for commonly filtering at least trash waste from said combined first and second airstreams in said second configuration;

said trash waste being automatically removed from said second filter device in said second configuration while continuously drawing both of said first airstream and said second airstream; and said apparatus further comprising a control device configured to automatically shift said filtering system between said first and second configurations.

2. The apparatus as in claim 1, wherein said first filter device comprises a centralized filtering system for filtering said first airstreams from a plurality of said textile machines.

3. The apparatus as in claim 2, wherein said centralized filtering system comprises a fiber separator.

4. The apparatus as in claim 3, further comprising an additional filter operably disposed upstream of said fiber separator.

5. The apparatus as in claim 2, wherein said second filter device comprises an individual filter device disposed in a housing structure proximate the end of each textile machine, each said second filter device in pneumatic communication with said centralized filtering system.

6. The apparatus as in claim 1, wherein said second airstream ms combined with said first airstream without being filtered in said second configuration, said control device comprising means for at least partially isolating said first filtering device from said combined airstreams and directing said combined airstreams to said third filter device in said second configuration, said third filtering device filtering both white waste and trash waste from said combined airstreams.

7. The apparatus as in claim 6, wherein said control device comprises an actuable device configured to displace said second filter device in said second configuration so that said second airstream does not pass therethrough but combines with said first airstream wherein said combined airstreams are conveyed to said third filter device.

8. The apparatus as in claim 7, wherein said actuable device comprises a mechanical arm configured to tilt said second filter device in said second configuration to such an angle so that said second airstream is drawn therepast by said common vaccum system so that said second airstream strips waste fiber away from said second filter device when said second filter device is tilted.

9. The apparatus as in claim 1, wherein said second airstream is combined with said first airstream without being filtered in said second configuration, said white waste being temporarily collected by a filter other than said first filtering device in said second configuration, said control device comprising means for at least partially isolating said first filtering device from said combined airstreams and directing said combined airstreams to said third filter device in said second configuration, said third filtering device filtering trash waste from said combined airstreams.

10. The apparatus as in claim 9, wherein in said second configuration said second filter device collects said white trash from said first airstream, said white trash being drawn from said second filter device once said apparatus is shifted back to said first configuration to be filtered by said first filtering device.

11. The apparatus as in claim 5, further comprising ducting and automatic valves controlled by said control device and configured to isolate said individual filter device in said housing structure so that said second airstream is directed to combine with said first airstream without passing through said individual filter device.

12. The apparatus as in claim 1, wherein said third filter device comprises a fiber separator configured for filtering any combination of white trash and waste trash from said combined airstreams, said third filter device being isolatable from said first and second filter devices.

13. The apparatus as in claim 12, wherein said control device comprises remotely controlled valves configured for isolating said third filter device in said first configuration and automatically unisolating said third filter device in said second configuration.

14. The apparatus as in claim 13, wherein said control device further comprises a remotely controlled tilting mechanism connected to said second filter device to tilt said second filter device in said second configuration to such an angle so that said second airstream is draw therepast by said common vacuum system, said tilting mechanism means and said valves being essentially simultaneously actuable.

15. The apparatus as in claim 13, wherein said control device further comprises at least one remotely controlled valve and ducting configured to draw said second airstream so that said second airstream does not pass through said second filter device but combines with said first airstream in said second configuration.

16. The apparatus as in claim 5, wherein said housing structure is divided into at least two chambers wherein in said first configuration said second airstream is conveyed into a first said chamber to be drawn through said second filter device and said first airstream is conveyed through said first chamber into a second said chamber to be drawn therefrom through said first filtering device, said control device further comprises at least two remotely controlled actuable dampers disposed relative said housing and chambers so that in said second configuration said dampers are positionable to cause said first airstream to be drawn from said second chamber into said first chamber and to cause said second airstream and first airstream to be drawn from said first chamber to said third filtering device.

17. The apparatus as in claim 1, wherein said filtering system further comprises a fourth filter device configured for filtering fine particulate matter not filtered by said first, second, or third filter device.

18. The apparatus as in claim 1, further comprising an auxiliary vacuum and filtering system for drawing said first and second airstreams and filtering at least said first airstream, said auxiliary system acting as a back-up to said common vacuum system and said first filter device.

19. The apparatus as in claim 18, wherein said auxiliary vacuum and filtering system comprises a fan and filter disposed in an end-housing structure adjacent said textile machine, and an isolation device configured for isolating said auxiliary fan and filter from said common vacuum system, said fan capable of drawing said first and second airstreams from said textile machine.

20. An air handling and filtering system for servicing a plurality of textile machines, said system configured for drawing and filtering at least first and second separate airstreams from the textile machines without adversely interrupting either airstream for cleaning or maintenance of said system, said system comprising:

a centralized common vacuum system for drawing said airstreams from said textile machines;

a centralized common first filtering device in pneumatic communication with said common vacuum system and said textile machines and configured for filtering white waste from said first airstreams in a normal operating configuration of said system;

an end-housing unit generally adjacent the end of each said textile machine, said first and second airstreams drawn through said end-housing unit by said common vacuum system;

a second filtering device disposed within said end-housing unit and configured for filtering trash waste from said second airstream passing therethrough in said normal operating configuration;

remotely actuable devices operably configured with said first filtering device and said second filtering device for isolating said second airstream from said second filtering device and for combining said second airstream with said first airstream in an alternate configuration of said system; and a centralized third filtering device in pneumatic communication with said end-housing unit for receiving said combined airstream and filtering at least trash waste therefrom when said system is shifted to said alternate configuration such that said second filtering device is automatically cleaned in said alternate configuration while continuously drawing both said airstreams, said third filtering device being selectively isolatable at least partially from said first filtering device.

21. The system as in claim 20, wherein said remotely actuable devices comprise an actuable displacing element configured with second filtering device for displacing said second filtering device to an alternate position wherein said second airstream does not pass therethrough, said second airstream thereby combining with said first airstream so that a combined airstream is created which conveys both white waste and trash waste.

22. The system as in claim 20, wherein said remotely actuable devices comprise remotely controlled valves and associated ducting configured to cause said second airstream to be drawn from said end-housing unit without passing through said second filtering device and to combine with said first airstream before said third filtering device.

23. The system as in claim 20, further comprising an auxiliary fan and filter housed within said end-housing units, said auxiliary fan and filter configured as a back-up for said common vacuum system and said first filtering device.

24. The system as in claim 20, wherein in said alternate system configuration said second filtering device is automatically displaced to an alternate position for cleaning said second filtering device, in said alternate position said second airstream stripping waste trash from said filter wherein said stripped waste trash is conveyed to said third filtering device with said combined airstream.

25. The system as in claim 20, further comprising a remote control station for actuating said displacing element and activating said third filtering device.

26. The system as in claim 20, wherein said remotely actuable devices comprise remotely controlled valves, dampers, and associated ducting configured so that in said second configuration said second airstream is drawn from said end-housing unit without passing through said second filtering device and said first airstream is drawn through said second filtering device for temporarily collecting white trash thereon before combining with said second airstream.

27. A method for separately filtering two independent airstreams from a plurality of textile machines for filtering generally useable fiber material and generally trash fiber material without adversely affecting production at the textile machines, said method comprising the steps of:

drawing first and second independent airstreams from the textile machines with a common vacuum source, the first airstream conveying the useable fiber material and the second airstream conveying the trash fiber material;

filtering the first airstream with a first filter device, and filtering the second airstream with a second filter device in a normal operating configuration of the filter devices; and automatically shifting to an alternate configuration of the filter devices wherein the second airstream is combined with the filtered or unfiltered first airstream without filtering the second airstream for a period of time for cleaning the second filter device, and directing the combined airstream to a third selectively isolatable filter device for filtering at least trash fiber material therefrom.

28. The method as in claim 27, including displacing the second filter device in the alternate configuration to position wherein the second airstream is drawn past the second filter by the common vacuum source.

29. The method as in claim 28, including displacing second filter device so that the second airstream is drawn past the second filter device, the second airstream thereby stripping any trash fiber material from the second filter device.

30. The method as in claim 29, including unisolating the third filter device simultaneously with displacing the second filter device to its alternative configuration.

31. The method as in claim 30, including remotely controlling unisolating the third filter device and displacing of the second filter device.

32. An air handling apparatus for use with textile machines for separately filtering useable fiber material and waste fiber material without adversely interrupting operation of the textile machine, said apparatus comprising:

a common vacuum system, said common vacuum system configured for drawing first and second independent airstreams from each of a plurality of said textile machines, said first airstream conveying generally useful white waste from a said textile machine and said second airstream conveying generally trash waste from a said textile machine; and a filtering system in pneumatic communication with said common vacuum system, said filtering system comprising a centralized first filter device common to said first airstreams and said second airstreams from said plurality of textile machines and configured to filter one of said white waste and said trash waste in a first configuration of said filtering system, a plurality of second filter devices, a said second filter in operative communication upstream from said first filter with each of the said first and said second airstreams carrying the other of said white waste and said trash waste than said one of said white waste and said trash waste filtered by said first filter in said first configuration, each said second filter configured to filter said other waste in said first configuration, a third filter device configured to filter at least said other waste, and a control device configured to automatically shift said filtering system from said first configuration to a second configuration wherein said other waste is automatically removed from each said second filter, wherein said airstreams filtered by said second filters in said first configuration are combined unfiltered with said airstreams filtered by said first filter in said first configuration, wherein said first filter is at least partially isolated from said combined airstream, and wherein said combined airstream is directed to and filtered by said third filter.

33. The air handling apparatus as in claim 32, wherein said first filter is configured to filter said white waste from said first airstreams in said first configuration.

* * * * *

UNITED STATES PATENT AND TRADEMARK OFFICE
CERTIFICATE OF CORRECTION

PATENT NO. : 5,647,889
DATED : July 15, 1997
INVENTOR(S) : Helmut Stueble

It is certified that error appears in the above-indentified patent and that said Letters Patent is hereby corrected as shown below:

Column 1, line 45, after "drawn" insert --, which is a generally undesirable condition--; and Column 8, line 16, delete "direct".

In Claim 6, column 10, line 58, delete "ms" and insert therefor --is--.

Signed and Sealed this

Tenth Day of February, 1998

Attest:

BRUCE LEHMAN

Attesting Officer

Commissioner of Patents and Trademarks